United States Patent
Mayes et al.

(10) Patent No.: US 8,985,941 B2
(45) Date of Patent: Mar. 24, 2015

(54) FIRESEAL

(75) Inventors: Harold G. Mayes, Whitwick (GB); Andrew J. Mullender, Nottingham (GB); Graeme C. Hunt, Nottingham (GB); Paul R. Adlington, Derby (GB)

(73) Assignee: Rolls-Royce plc, London (GB)

( * ) Notice: Subject to any disclaimer, the term of this patent is extended or adjusted under 35 U.S.C. 154(b) by 856 days.

(21) Appl. No.: 13/009,357

(22) Filed: Jan. 19, 2011

(65) Prior Publication Data

US 2011/0203251 A1     Aug. 25, 2011

(30) Foreign Application Priority Data

Feb. 19, 2010  (GB) .................................. 1002838.9
Feb. 19, 2010  (GB) .................................. 1002840.5

(51) Int. Cl.

| | |
|---|---|
| *F16J 15/02* | (2006.01) |
| *F16J 15/06* | (2006.01) |
| *F02C 7/25* | (2006.01) |
| *C23C 4/18* | (2006.01) |

(52) U.S. Cl.
CPC ............. *F16J 15/022* (2013.01); *F16J 15/065* (2013.01); *F02C 7/25* (2013.01); *C23C 4/185* (2013.01); *Y02T 50/67* (2013.01)
USPC ............ 415/134; 277/631; 277/644; 277/648

(58) Field of Classification Search
USPC ............................... 415/174.2, 134, 135, 138; 277/546–547, 631–632, 644, 645, 648
See application file for complete search history.

(56) References Cited

U.S. PATENT DOCUMENTS

| | | | | |
|---|---|---|---|---|
| 3,218,211 | A | * | 11/1965 | Taylor et al. .................. 156/217 |
| 3,566,541 | A | * | 3/1971 | Coulter ........................ 49/475.1 |
| 3,829,228 | A | * | 8/1974 | Miyazaki et al. ............... 404/68 |
| 4,189,161 | A | * | 2/1980 | Grimm ......................... 277/496 |
| 4,331,337 | A | * | 5/1982 | Cross et al. ................... 277/305 |
| 5,027,970 | A | | 7/1991 | Sanford |
| 5,079,417 | A | * | 1/1992 | Strand .......................... 250/221 |
| 5,251,917 | A | | 10/1993 | Chee et al. |
| 6,981,738 | B2 | * | 1/2006 | Schonebeck et al. .... 296/216.09 |
| 7,117,737 | B2 | * | 10/2006 | Sallee et al. .................... 73/273 |
| 7,390,160 | B2 | * | 6/2008 | Blatchford et al. .............. 415/1 |
| 2003/0006344 | A1 | | 1/2003 | Pauly |
| 2003/0066933 | A1 | * | 4/2003 | Maury et al. ................. 244/130 |
| 2005/0212220 | A1 | | 9/2005 | Graham |

(Continued)

FOREIGN PATENT DOCUMENTS

| | | | |
|---|---|---|---|
| FR | 2 789 144 A1 | 8/2000 |
| FR | 2 793 538 A1 | 11/2000 |

(Continued)

OTHER PUBLICATIONS

Internet print-out of http://web.archive.org/web/20090206075321/http://extrudedsolutions.com.*

(Continued)

*Primary Examiner* — Edward Look
*Assistant Examiner* — Christopher R Legendre
(74) *Attorney, Agent, or Firm* — Oliff PLC

(57) ABSTRACT

An elongate fireseal having two ends joined by a longitudinal axis. The fireseal comprises at least two portions having D-shaped cross section and adjacent portions share a common dividing wall. Each end of the fireseal is configured to interlock with a complementary opposite end of the same or a further fireseal.

17 Claims, 3 Drawing Sheets

(56) References Cited

U.S. PATENT DOCUMENTS

2005/0266200 A1* 12/2005 Padmanabhan ................ 428/54
2006/0143988 A1*  7/2006 Dillmann ..................... 49/498.1
2008/0252021 A1* 10/2008 Handley et al. ............... 277/628
2011/0018213 A1*  1/2011 Bunel ........................... 277/645

FOREIGN PATENT DOCUMENTS

GB           2 415 471 A    12/2005
WO     WO 2007/067108 A1     6/2007
WO     WO 2009056700 A1 *   5/2009

OTHER PUBLICATIONS

Wayback machine printout of http://web.mit.edu/16.unified/www/FALL/thermodynamics/notes/node28.html (Aug. 14, 2007).*

Internet print-out of http://web.archive.org/web/20090206075321/http://extrudedsolutions.com (Feb. 6, 2009).*

British Search Report issued in Application No. 1002838.9; Dated Jun. 16, 2010.

British Search Report issued in Application No. 1002840.5; Dated Jun. 22, 2010.

* cited by examiner

FIRESEAL

The present invention relates to fireseals, in particular to seal between fairing panels for a gas turbine engine.

A gas turbine engine comprises fairings that are constructed from a plurality of fairing panels. The joins between panels must be sealed. Typically the fairing experiences a pressure differential, there being a higher pressure in the core engine than outside the fairing. Additionally, some joins between fairing panels form the boundary between designated fire zones in the engine. For certification of a gas turbine engine it is necessary to prevent fire from propagating through such boundaries for a given period of time and to arrest propagation for a further period thereafter to allow safe shut down of the engine or other remedial action to occur. Fire propagation is increased along air leakage paths so it is also beneficial for the fire sealing that the fairing be sealed against air leakage.

Conventionally O, D, P or Ω shaped seals are used to seal between fairing panels and the like. A further conventional method of sealing comprises fingers seals. A finger seal comprises an elongate sealing member affixed to one fairing panel and abutting the opposing fairing panel. Typically conventional seals are produced in elongate sections of standard length. Since fairings are generally annular it is often necessary to join the ends of one or more lengths of seal to seal a gap between fairing panels. This requires that the cross sectional outline of the seal ends to be mated are bonded together, for example using adhesive. In general the walls of conventional seals are thin so the surface area for bonding between lengths of seal is correspondingly small and the resultant bond is weak. This results in poor sealing and provides a preferential route for fire propagation through a fireseal using such conventional seals thereby considerably shortening the length of time that the fireseal can prevent or retard fire penetration of the fairings.

It is an object of the present invention to provide a fireseal that seeks to address the aforementioned problems.

Accordingly the present invention provides an elongate fireseal having two ends joined by a longitudinal axis, the fireseal comprising at lest two portions having D-shaped cross section, adjacent portions sharing a common dividing wall wherein each end of the fireseal is configured to interlock with a complementary opposite end of the same or a further fireseal.

This is advantageous because it provides a relatively large surface area for bonding two fireseals together resulting in a stronger bond. Additionally there is greater fire protection because the bond line, identified as an area of potential weakness, is a torturous shape and there are multiple walls to prevent or retard the fire's penetration.

There may be two portions to form a fireseal that is B-shaped in cross section. This provides three walls for fire to penetrate. Alternatively there may be three portions, providing four walls to penetrate.

The fireseal may further comprise at least one finger seal extending transversely from one side of the fireseal. In cross section a finger seal may extend from the base of the B-shape, from the straight or curved side. Or two finger seals may extend, one from each of the straight and curved sides. The at least one finger seal may be sprung towards the side of the fireseal.

The end configured to interlock may comprise a longitudinal offset between ends of adjacent portions. This gives a stepped configuration divided longitudinally through the common dividing wall so that there is wall bonded to wall when two such fireseals are joined longitudinally.

The end of each portion may be perpendicular to the longitudinal axis. Alternatively, the end of at least one portion may be angled relative to the longitudinal axis. All the portions may be angled in parallel or at least two portions may be angled at different angles. Adjacent portions may be angled at opposite angles to the perpendicular to the longitudinal axis. This means one angle is acute and one obtuse when calculated in the same sense from the longitudinal axis.

The at least one finger seal may comprise a reinforcing bead at its distal end to the fireseal. Alternatively or additionally the finger seal may comprise a reinforcing plate. The reinforcing bead or plate may comprise metal or high temperature plastic.

The present invention also provides a gas turbine engine comprising a fireseal as described in any of the paragraphs above wherein a first side is bonded to a first fairing wall defining a gap to be sealed and a second side abuts a second fairing wall defining the gap.

The present invention will be more fully described by way of example with reference to the accompanying drawings, in which.

Figure 1:
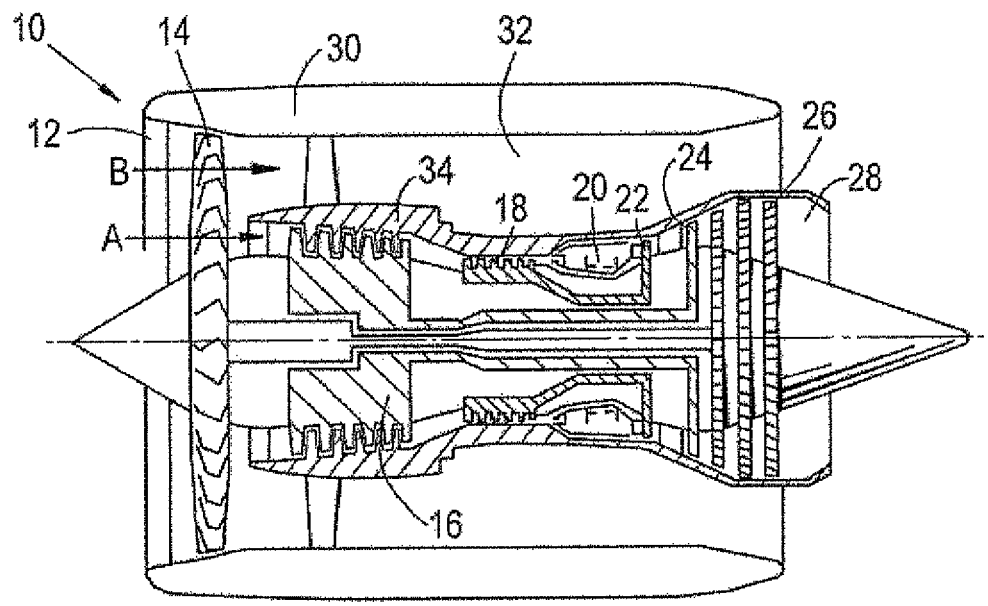
FIG. 1 is a sectional side view of a gas turbine engine.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

The fairings 34 surround the core engine. A fairing panel 40 is shown in a more detailed cross section in FIG. 2. The fairing panel 40 comprises a honeycomb central structure 42 with a composite skin 44 forming each of its top and bottom surfaces. The edge 46 of the fairing panel 40 generally comprises a hollow area, defined by some of the walls of a honeycomb section of the central structure 42. Typically the edge area 46 is filled with a non-fireproof filler material. The corner 48 is at the junction between the composite skin 44 and the edge 46, on the high pressure side of the fairing panel 40. The corner 48 may be radiused, as illustrated, or be square or have a fillet in other arrangements. The composite skin 44 on the high pressure side of the fairing panel 40 may wrap part of the way around the corner 48 and at least partially cover the edge 46 and the filler therein. Nevertheless, the composite skin 44 is not sufficient to prevent fire from propagating into the filler, and nor does it have sealing capabilities.

Figure 2:
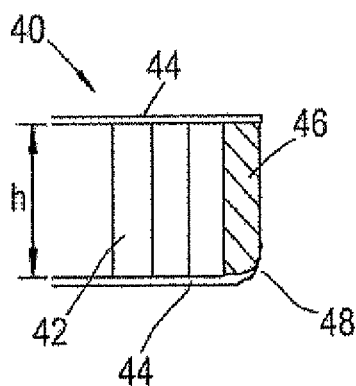
FIG. 2 is a sectional view of part of a gas turbine engine fairing.
Figure 3:
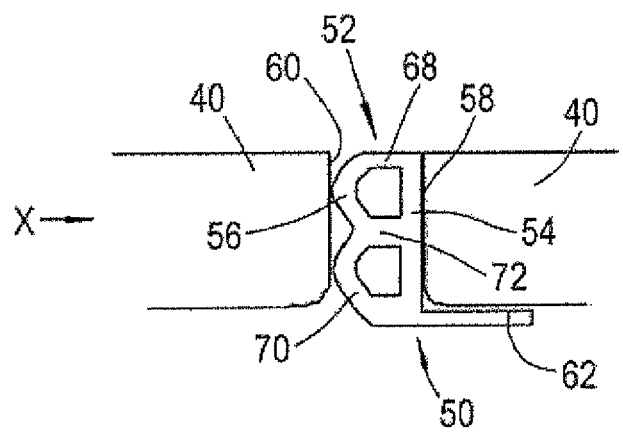
FIG. 3 to FIG. 5 are schematic perspective views of variants of a fireseal according to the present invention.

A first embodiment of the present invention is shown in FIG. 3 which shows a pair of fairing panels 40 each having the composition described with respect to FIG. 2. A fireseal 50 is located between the fairing panels 40 in order to seal the gap 52 therebetween. The fireseal 50 has a first side 54 that is straight and may be bonded to a first wall 58 of one of the fairing panels 40, by adhesive or another known method. The fireseal 50 also has a second side 56 that abuts a second wall 60 of the other fairing panel 40 to seal against it in use. As with conventional seals, the fireseal 50 of the present invention is manufactured for an expected compression of 20 to 40% in use. This enables the fireseal 50 to seal despite manufacturing tolerances of and relative movement between the fairing panels 40.

The fireseal 50 of the present invention comprises first and second portions 68, 70 that are each D-shaped in cross section. The lower wall of the first, upper portion 68 and the upper wall of the second, lower portion 70 form a common dividing wall 72. Each of the first and second portions 68, 70 encompasses part of the first, straight side 54 and second, curved side 56 of the fireseal 50 so that the fireseal 50 is B-shaped in cross section. It is beneficial to provide a B-shaped fireseal 50 as it provides two points of sealing abutment with the second wall 60 of the fairing panel 40, rather than the single point in prior art seal shapes. Additionally, there are three walls, including the common dividing wall 72, for fire to penetrate from one side of the fairing panels 40 to the other.

As shown in FIG. 3, the fireseal 50 includes a leg 62 that extends perpendicularly in cross section to form a finger seal. The leg 62 extends from one end of the first side 54 and lies alongside the surface of the fairing panel and may be bonded to it using adhesive or another known method of bonding.

Figure 4:
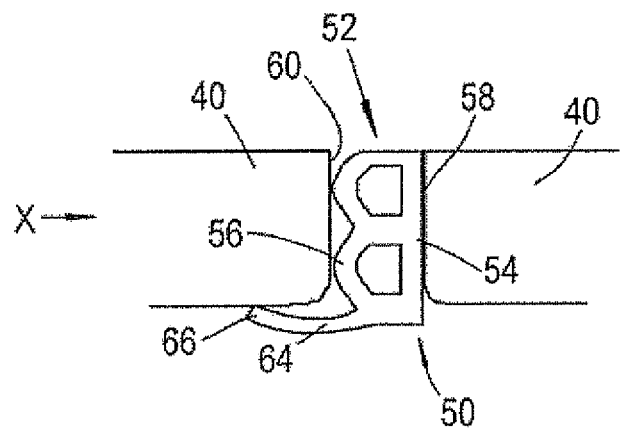

FIG. 4 is a variant of FIG. 3 but instead of the leg 62 there is leg 64 extending from one end of the second side 56. The leg 64 is curved in cross section so that its distal end 66 is sprung against the surface of the fairing panel 40 to provide a further point of sealing abutment to further prevent fire penetration.

Figure 5:
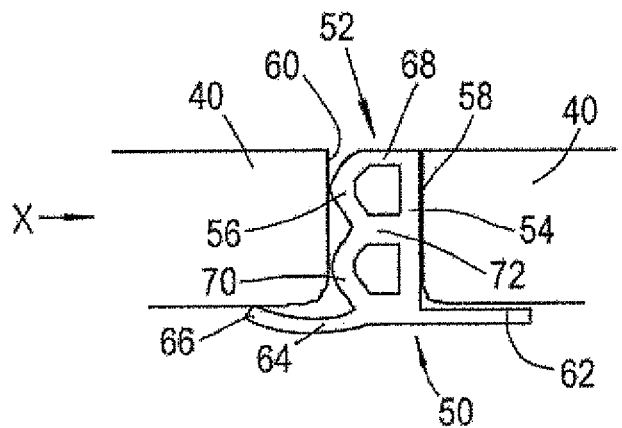

FIG. 5 is similar to both FIGS. 3 and 4. It includes both the leg 62 extending from the first side 54 and the leg 64 extending from the second side 56. This variant is particularly beneficial as it protects the corners 48 of both fairing panels 40 from fire damage.

There may be a reinforcing bead provided at the distal end 66 of the leg 64. This bead both increases the resistive spring action against the fairing panel 40, which enables the sealing abutment to be maintained despite relative movement between the fairing panels 40 in use, and may reduce fretting of the distal end 66 of the leg 64 against the composite skin 44. The bead may be embedded within the distal end 66 of the leg 64 or be attached thereto. Alternatively or additionally the leg 64 may comprise a reinforcing plate that is embedded within the leg 64 or attached thereto. The reinforcing plate may extend substantially over the whole length of the leg 64 or may extend over a part thereof. The reinforcing plate may extend from the leg 64 into the first 54 or second 56 sides or into the other leg 62.

Figure 6:
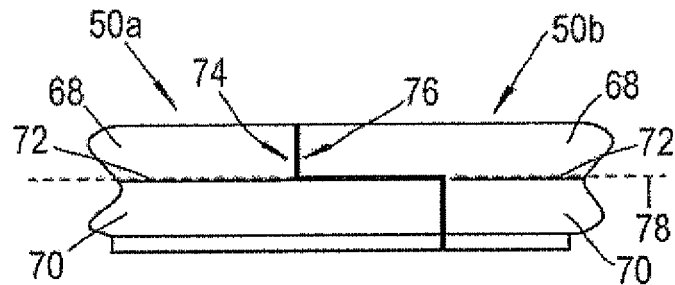
FIG. 6 to FIG. 10 are each a view on X of embodiments of a fireseal according to the present invention.

FIG. 6 is a view on X, as indicated in any of FIGS. 3 to 5, and can be applied to any of those variants with equal felicity. Part of two fireseals 50a, 50b are shown in longitudinal abutment. Each fireseal 50a, 50b comprises two D-shaped portions 68, 70 having a common dividing wall 72 as described with respect to any of FIGS. 3 to 5. An end 74 of the left-hand fireseal 50a is configured to interlock with a complementary opposite end 76 of the right-hand fireseal 50b. The interlock takes the form of a stepped end profile of each fireseal 50a, 50b. Thus, for the left-hand fireseal 50a, the end of the upper portion 68 is longitudinally offset from the end of the lower portion 70. The end of each portion 68, 70 is perpendicular to the longitudinal axis 78, which is parallel to the common dividing wall 72.

Those skilled in the art will readily understand that a single length of fireseal 50 may have its ends 74, 76 joined to form an annular seal where the length of the fireseal 50 is the same as or longer than the circumference of the annulus to be sealed. in other applications, two or more fireseals 50a, 50b may be joined by their ends 74, 76 to form the annular seal. It is therefore preferable that each fireseal 50 has its ends 74, 76 configured to be complementary to each other so as to interlock one with the other. This facilitates mass production of the fireseals 50 so that any fireseal 50a can be placed end to end with any other fireseal 50b and the ends will interlock to form a continuous fireseal 50.

The advantage of providing a fireseal 50 with interlocking ends 74, 76 is that there is a larger surface area for bonding between the left-hand fireseal 50a and the right-hand fireseal 50b, as shown by the heavy lines. In particular, although the upper and lower portions 68, 70 are generally hollow and so comprise only a thin circumferential part for bonding to the other fireseal 50, the common dividing wall 72 is of sufficient thickness that it can be split longitudinally to form the longitudinal offset between the ends 74 of the upper and lower portions 68, 70. This means that there is substantially planar wall 72 that overlaps between the left-hand fireseal 50a and the right-hand fireseal 50b and to which adhesive can be applied. Alternatively a different method of bonding can be used. Advantageously, the resultant join between the fireseals 50a, 50b is stronger than in prior art arrangements and, even if the bonding is not as strong as intended in an individual application, offers a more torturous path of potential weakness for fire to penetrate thereby retarding its progress.

Figure 7:
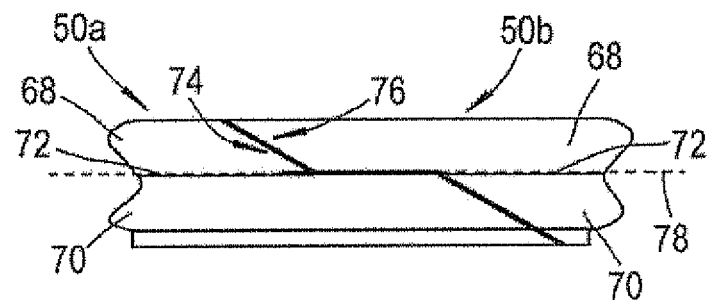

FIGS. 7 to 10 show alternative forms of the ends 74, 76 of the fireseal 50 that are configured to interlock. Thus, FIG. 7 shows the complementary ends 74, 76 of the fireseals 50a, 50b being angled relative to the longitudinal axis 78. In this embodiment, the ends of each of the upper and lower portions 68, 70 are angled in parallel, so that both of the ends 74 make the same angle with the longitudinal axis 78, acute in the clockwise sense. The ends 76 make the complementary angle with the longitudinal axis 78. As in the embodiment of FIG. 6, there is a substantial overlap of the common dividing wall 72 of each fireseal 50a, 50b to enable a strong bond to be formed between the fireseals 50a, 50b. The overlap also acts as a further wall for fire to penetrate, even after it has penetrated the lower wall.

Figure 8:
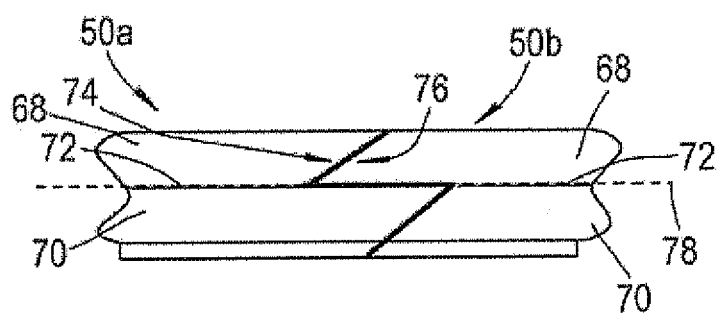

FIG. 8 shows a further alternative form of the ends 74, 76 of the fireseal 50 that are configured to interlock. The complementary ends 74, 76 are, again, angled relative to the longitudinal axis 78 and the upper and lower portions 68, 70 are angled in parallel to each other. However, in this embodiment the ends 74, 76 are angled in the opposite sense to the previous embodiment, forming an obtuse angle in the clockwise sense, which advantageously provides a more compact joint region between the left-hand fireseal 50a and right-hand fireseal 50b, without reducing the interlocking surface area for available for bonding therebetween.

Figure 9:
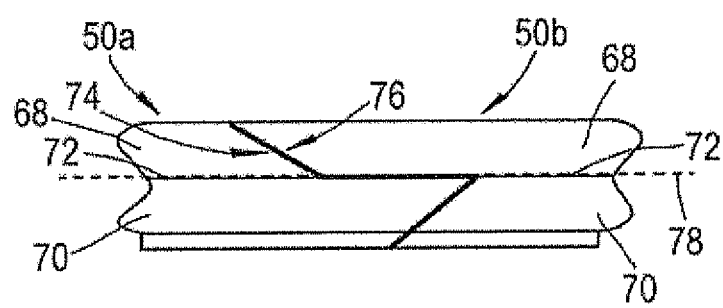
Figure 10:
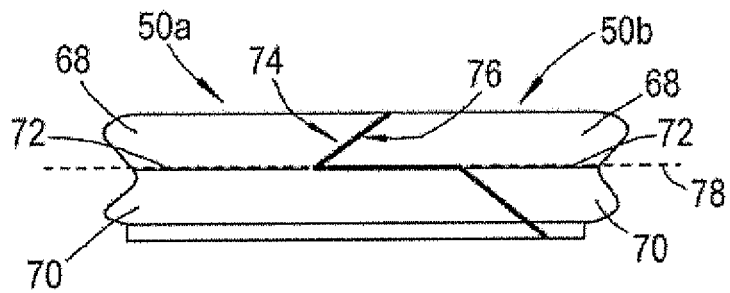

FIGS. 9 and 10 show further embodiments of the ends 74, 76 that are configured to interlock with complementary opposite ends 76, 74 of the fireseals 50a, 50b. In these embodiments the ends 74, 76 of both upper and lower portions 68, 70 are angled relative to the longitudinal axis 78 but are not parallel to each other. Similarly, one of the portions 68, 70 could have an end 74, 76 that is perpendicular to the longitudinal axis 78 whilst the other of the portions 68, 70 has an end 74, 76 that is angled in either sense relative to the longitudinal axis 78.

Although the fireseal 50 of the present invention has been described having two portions 68, 70 that are D-shaped in cross section, the fireseal 50 could comprise three or more such portions with equal felicity. Each additional portion provides a further sealing point on the second side 56 of the fireseal 50 to abut the second wall 60 of the fairing panel 40. The number of portions may depend on the dimensions of the gap 52 to be sealed and the period of time that it is desirable to prevent fire penetration. By providing more than two portions 68, 70 that are D-shaped in cross section, the ends 74, 76 may be configured to interlock with the complementary opposite end 76, 74 in more complex shapes. For example, a middle portion of three portions could longitudinally protrude relative to the adjacent portions at one end 74 and the outer portions could longitudinally protrude relative to the adjacent middle portion at the complementary opposite end 76. The skilled reader will readily identify further forms of interlock configuration for the complementary ends 74, 76 of the fireseals 50*a*, 50*b*.

Although the junctions between parts of the fireseal 50 have been illustrated as square joints they may equally comprise radii or fillets to reduce stress and simplify manufacture as is well understood in the art. The thickness of each part of the fireseal 50 is a matter of design choice for the particular application envisaged.

Although the leg 64 has been illustrated as smooth, it may equally be provided with ribs, knurling or another type of surface roughness, particularly at its distal end 66, to improve the sealing abutment between the leg 64 and the surface of the fairing panel 40.

Although the fireseal 50 is manufactured from conventional materials, generally glass cloth impregnated with silicon rubber, and will therefore succumb to the fire after a period of time, by providing more walls for the fire to penetrate the present invention lengthens that period which grants more time for remedial action such as engine shut down to be instigated. The flexible nature of the fireseal 50 permits the fireseal 50 to accommodate manufacturing tolerances and movement in use of the fairing panels 40 relative to each other, in both directions transverse to the longitudinal axis 78 of the fireseal 50. It also enables the fireseal 50 to be readily attached to a curved edge, by adhesive bonding or other methods known in the art, so as to seal straight gaps 52 and curved gaps such as an annular gap 52 between fairing panels 40. Additionally, the fireseal 50 is relatively soft to touch thereby providing some cushioning and protection from sharp edges for maintenance staff who need to manipulate fairing panels 40 having the fireseals 50 attached thereto.

The fireseal 50 of the present invention is particularly suited for sealing between fairing panels 40 of a gas turbine engine 10. Fairing panels 40 are periodically separated to access components of the engine 10. Since the present fireseal 50 is only bonded to one of the fairing panels 40 forming the gap 52 to be sealed, it permits this separation to occur without requiring removal and replacement of the fireseal 50. The fireseal 50 can also be used for sealing between other pairs of panels 40 between which fluid may leak and/or fire may otherwise propagate, for example engine enclosures, the nacelle 21 or cowlings, and aircraft panels.

In other fields, the fireseal 50 of the present invention may be used for sealing doors and access panels, particularly for commercial and road vehicles, railway rolling stock and marine vessels; domestic, commercial and industrial fire doors and oven doors.

The invention claimed is:

1. An elongate fireseal suitable for a gas turbine engine and having two ends joined by a longitudinal axis, the fireseal comprising at least two portions each having a D-shaped cross section, adjacent D-shaped portions sharing a common dividing wall, wherein:
    a first end of a first D-shaped portion is longitudinally offset from a first end of a second D-shaped portion,
    the first end of the first D-shaped portion and the first end of the second D-shaped portion are configured to interlock with a complementary opposite end of the same or a further fireseal, and
    two of the at least two D-shaped portions are joined such that the fireseal is B-shaped in cross section.

2. The fireseal as claimed in claim 1, wherein the at least two D-shaped portions include a third portion.

3. The fireseal as claimed in claim 1, wherein the fireseal further comprises at least one finger seal extending transversely from one side of the fireseal.

4. The fireseal as claimed in claim 3, wherein the at least one finger seal is sprung towards the one side of the fireseal.

5. The fireseal as claimed in claim 4, wherein the first ends of the first and second D-shaped portions are perpendicular to the longitudinal axis.

6. The fireseal as claimed in claim 4, wherein at least one of the first ends of the first and second D-shaped portions is angled relative to the longitudinal axis.

7. The fireseal as claimed in claim 6, wherein the at least two D-shaped portions are angled and are parallel with each other.

8. The fireseal as claimed in claim 6, wherein the at least two D-shaped portions are angled at different angles.

9. The fireseal as claimed in claim 6, wherein the at least two D-shaped portions are configured to be angled to adjacent portions at opposite angles to an axis perpendicular to the longitudinal axis.

10. The fireseal as claimed in claim 3, wherein the at least one finger seal comprises a reinforcing bead at a distal end of the finger seal.

11. The fireseal as claimed in claim 10, wherein the reinforcing bead comprises metal or high temperature plastic.

12. The fireseal as claimed in claim 3, wherein the at least one finger seal comprises a reinforcing plate.

13. The fireseal as claimed in claim 12, wherein the reinforcing plate comprises metal or high temperature plastic.

14. The fireseal as claimed in claim 1, wherein the first ends of the first and second D-shaped portions are each configured to form a longitudinal offset with ends of adjacent portions.

15. A gas turbine engine fairing comprising a fireseal as claimed in claim 1, wherein a first side of the fireseal is bonded to a first fairing wall defining a gap to be sealed and a second side of the fireseal abuts a second fairing wall defining the gap.

16. The fireseal as claimed in claim 1, wherein the fireseal is configured to be placed between fairing panels surrounding the gas turbine engine.

17. The fireseal as claimed in claim 1, wherein the first ends of the first and second D-shaped portions are each configured to interlock with the complementary opposite end of the further fireseal.

* * * * *